United States Patent [19]

Noguchi et al.

[11] 4,149,511

[45] Apr. 17, 1979

[54] TORCH IGNITION TYPE INTERNAL COMBUSTION ENGINE

[75] Inventors: Masaaki Noguchi, Nagoya; Masumi Iwai, Susono; Norihiko Nakamura, Mishima, all of Japan

[73] Assignee: Toyota Jidosha Kogyo Kabushiki Kaisha, Toyota, Japan

[21] Appl. No.: 803,271

[22] Filed: Jun. 3, 1977

Related U.S. Application Data

[63] Continuation of Ser. No. 600,046, Jul. 29, 1975, abandoned.

[30] Foreign Application Priority Data

Jul. 31, 1974 [JP] Japan .................................. 49-87805
Jul. 22, 1975 [JP] Japan .................................. 50-88794

[51] Int. Cl.² ............................................. F02B 23/00
[52] U.S. Cl. ........................... 123/191 SP; 123/32 K; 123/32 SP
[58] Field of Search ........ 123/32 CK, 32 ST, DIG. 4, 123/32 SP, 32 SA, 191 S, 191 SP, 37

[56] References Cited

U.S. PATENT DOCUMENTS

| | | | |
|---|---|---|---|
| 2,242,990 | 5/1941 | Brown | 123/75 B |
| 2,711,723 | 6/1955 | Summers | 123/191 SP |
| 3,144,013 | 8/1964 | Peras | 123/32 SA |
| 3,416,501 | 12/1968 | De Castelet | 123/32 SP |
| 3,916,858 | 11/1975 | Tagachi et al. | 123/191 SP |
| 3,921,605 | 11/1975 | Wyczulek | 123/191 S |
| 3,926,158 | 12/1975 | Dolza | 123/191 S |
| 3,980,057 | 9/1976 | Sanda et al. | 123/191 SP |
| 4,000,731 | 1/1977 | Nogachi et al. | 123/191 SP |
| 4,004,563 | 1/1977 | Nahamura et al. | 123/191 SP |

Primary Examiner—Charles J. Myhre
Assistant Examiner—David D. Reynolds
Attorney, Agent, or Firm—Stevens, Davis, Miller & Mosher

[57] ABSTRACT

A torch ignition type internal combustion engine which has no intake valve in the auxiliary combustion chamber and which can effectively purge exhaust gases from the auxiliary combustion chamber to eliminate ignition failures, the engine comprising a cylinder; a cylinder head having a semi-spherical inner wall; a reciprocating piston snugly received in the cylinder; a main combustion chamber defined between the cylinder head and piston and having intake and exhaust valves to control intake and exhaust ports in the cylinder head; an auxiliary combustion chamber provided at a suitable position in the cylinder head; and a passage intercommunicating the main and auxiliary combustion chambers. The passage opens into the main combustion chamber at a position close to one of the intake valve and the exhaust valve. In one embodiment, the passage opens into the main combustion chamber at a position close to and substantially intermediate the intake and exhaust valves. In another embodiment, the passage opens into the main combustion chamber near the intake valve and close to one side of the semi-spherical inner wall of the cylinder head.

8 Claims, 5 Drawing Figures

TORCH IGNITION TYPE INTERNAL COMBUSTION ENGINE

This is a Continuation of application Ser. No. 600,046 now abandoned filed July 29, 1975

BACKGROUND OF THE INVENTION

1. Field of the Invention

This invention relates to an improvement in an internal combustion engine that has a main combustion chamber equipped with an intake valve and an exhaust valve, and an auxiliary combustion chamber with no intake valve.

This invention further relates to a torch ignition type internal combustion engine, and more particularly to a torch ignition type internal combustion engine which has no intake valve in the auxiliary combustion chamber but is capable of effectively purging exhaust gases therefrom to ensure improved ignitability.

It is well known in the art to burn a rather lean air-fuel mixture in the engine cylinder in order to reduce the toxic components such as carbon monoxide, hydrocarbons and nitrogen oxides which are usually present in the engine exhaust. A lean air-fuel mixture, however, has inferior ignitability and flame propagation velocity, and allows raw air-fuel mixture to blow by to the exhaust manifold resulting in a reduction of the cyclic thermal efficiency.

2. Description of the Prior Art

In order to overcome the afore-mentioned difficulty, there has been introduced the so-called torch ignition type internal combustion engine which has a main combustion chamber with an intake valve and an exhaust valve, and an auxiliary combustion chamber with an intake valve, the engine being adapted to supply a lean air-fuel mixture to the main combustion chamber and a relatively thick or rich mixture to the auxiliary combustion chamber through the respective intake valves. In such an engine system, the relatively rich air-fuel mixture in the auxiliary combustion chamber is first ignited and burned, the flames bursting out from the auxiliary chamber subsequently igniting the lean air-fuel mixture in the main combustion chamber. This internal combustion engine with an intake valve in the auxiliary combustion chamber is advantageous in that it ensures combustion of the lean air-fuel mixture and high flame propagation velocity. On the other hand, such internal combustion engine invariably has a complicated construction due to the provision in the auxiliary combustion chamber of the intake valve which requires a complicated valve operating mechanism for opening and closing the same in predetermined timing.

The present inventors have previously proposed a torch ignition type internal combustion engine which comprises a main combustion chamber with an intake valve and an exhaust valve, an auxiliary combustion chamber with no intake valve, a passage intercommunicating the main and auxiliary combustion chambers, and an ignition plug having its sparking electrodes located in the auxiliary combustion chamber and in the vicinity of the intercommunicating passage. In this torch ignition type internal combustion engine, a lean air-fuel mixture inhaled into the main combustion chamber through the intake valve during the intake stroke of the piston is urged into the auxiliary combustion chamber during the succeeding compression stroke through the passage intercommunicating the main and auxiliary combustion chambers. With only fresh air-fuel mixture surrounding the sparking electrodes of the ignition plug which is located in the auxiliary combustion chamber in a position near the passage, the lean air-fuel mixture within the auxiliary combustion chamber is ignited and burned without material interference from exhaust gas which might still be remaining in the auxiliary chamber, followed by ignition of the lean air-fuel mixture in the main combustion chamber by the flames bursting out from the auxiliary combustion chamber.

With the above-described torch ignition type internal combustion engine with no intake valve in the auxiliary combustion chamber, it is necessary to purge the exhaust gases which remain in the auxiliary combustion chamber as otherwise the remaining exhaust gases would impair the ignitability of the combustible mixture.

SUMMARY OF THE INVENTION

It is an object of the present invention to provide a torch ignition type internal combustion engine which has no intake valve in the auxiliary combustion chamber and which can purge exhaust gases effectively from the auxiliary combustion chamber.

It is another object of the present invention to provide a torch ignition type internal combustion engine of the nature mentioned above, which is free from ignition failures due to the exhaust gas remaining in the auxiliary combustion chamber.

It is a further object of the present invention to provide a torch ignition type internal combustion engine of the nature mentioned above, which has an auxiliary chamber communicated with the main combustion chamber by way of a passage which opens into the main combustion chamber at a position close to one of the intake and exhaust valves.

It is a still further object of the present invention to provide a torch ignition type internal combustion engine of the nature mentioned above, which has an auxiliary chamber communicated with the main combustion chamber by way of a passage which opens into the main combustion chamber at a position close to and substantially intermediate the intake and exhaust valves thereof.

It is a still further object to provide a torch ignition type internal combustion engine of the nature mentioned above, which has an auxiliary chamber communicated with the main combustion chamber by way of a passage which opens into the main combustion chamber at a position at the side of the inner wall of the cylinder head near the intake valve.

It is a still further object of the invention to provide a torch ignition type internal combustion engine of the nature mentioned above, which is simple in construction and reliable in operation.

In the invention, the torch ignition type internal combustion engine comprises a cylinder; a cylinder head; a reciprocating piston received in said cylinder; a main combustion chamber defined between said cylinder head and said piston and having intake and exhaust valves to control the intake and exhaust ports in the cylinder head; an auxiliary combustion chamber provided at a suitable position in the cylinder head; a passage intercommunicating said main and auxiliary combustion chambers and opening into said main combustion chamber at a position close to the intake valve or the exhaust valve where the intake gas flow at high speed. The passage may advantageously open into the main combustion chamber at a position close to and substantially intermediate the intake and exhaust valves. The passage may also advantageously open into the main combustion chamber at a position near the intake valve to one side of the inner wall of the cylinder head and the sparking electrode portion of an ignition plug is disposed so as to be exposed to the passage. With this engine construction, the exhaust gas in the auxiliary combustion chamber is effectively purged therefrom by the ejection effect of the exhaust gas flows and combustible mixture flows occurring within the cylinder during the exhaust and intake strokes of the piston.

The above and other objects, features and advantages of the invention will become clear from the following detailed description of the invention and the appended claims, taken in conjunction with the accompanying drawings which show by way of example, preferred embodiments of the present invention.

Figure 1:
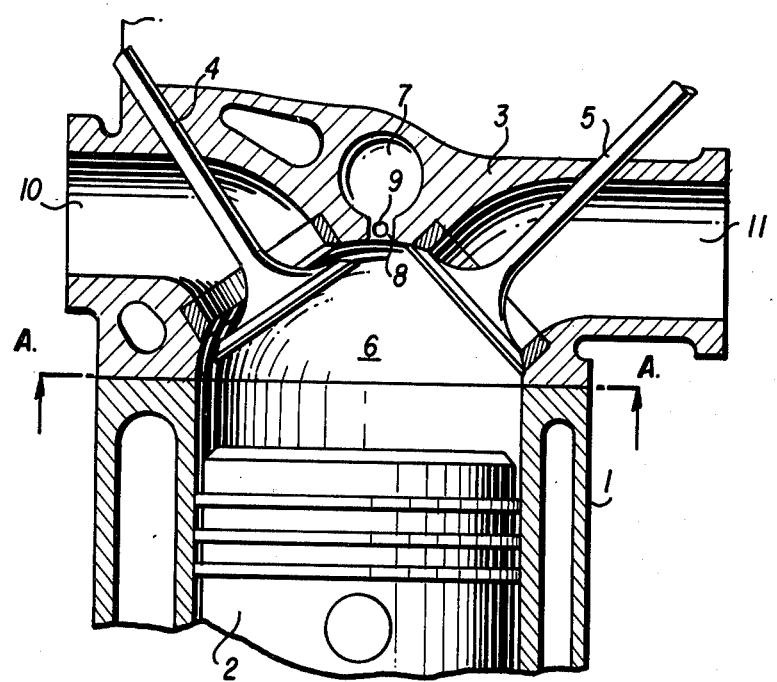
FIG. 1 is a sectional view of the torch ignition type internal combustion engine according to the present invention, which has no intake valve in its auxiliary combustion chamber.
Figure 2:
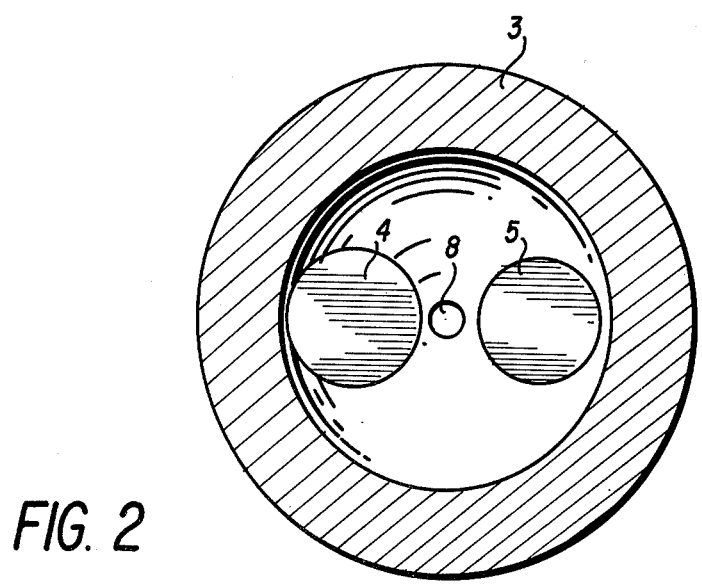
FIG. 2 is a sectional view taken along line A—A of FIG. 1.

DETAILED DESCRIPTION OF THE PREFERRED EMBODIMENTS:

Referring to the accompanying drawings and first to FIG. 1, the torch ignition type internal combustion engine according to the present invention includes a cylinder 1, a piston 2 snugly fit in the cylinder 1 for reciprocating movement therein in the usual manner, and an intake valve 4 and an exhaust valve 5 provided for the intake and exhaust ports in the cylinder head 3. The piston 2 and the cylinder head 3 define therebetween a main combustion chamber 6. In this connection, it is preferred that the inner wall of the cylinder head 3 defining the upper portion of the main combustion chamber 6 has a semi-spherically concave shape as shown particularly in FIG. 1. The cylinder head 3 has formed therein an auxiliary combustion chamber 7 in the form of a simple hollow cavity or recessed space. The auxiliary combustion chamber 7 has no intake valve of any kind and is communicated with the main combustion chamber 6 through a passage 8. The passage 8 intercommunicating the main and auxiliary chambers 6 and 7 is opened into the main chamber at a position close to and substantially intermediate the intake and exhaust valves 4 and 5. An ignition plug 9 is also mounted in the cylinder head 3 with the sparking electrode of the plug 9 located in a suitable position within and facing the passage 8. The cylinder head 3 further includes a combustible mixture supply passage 10 and an exhaust passage 11 which are connected to the intake valve 4 and the exhaust valve 5 to control the induction of the combustible mixture and exhaustion of the burned gases, respectively.

Figure 3:
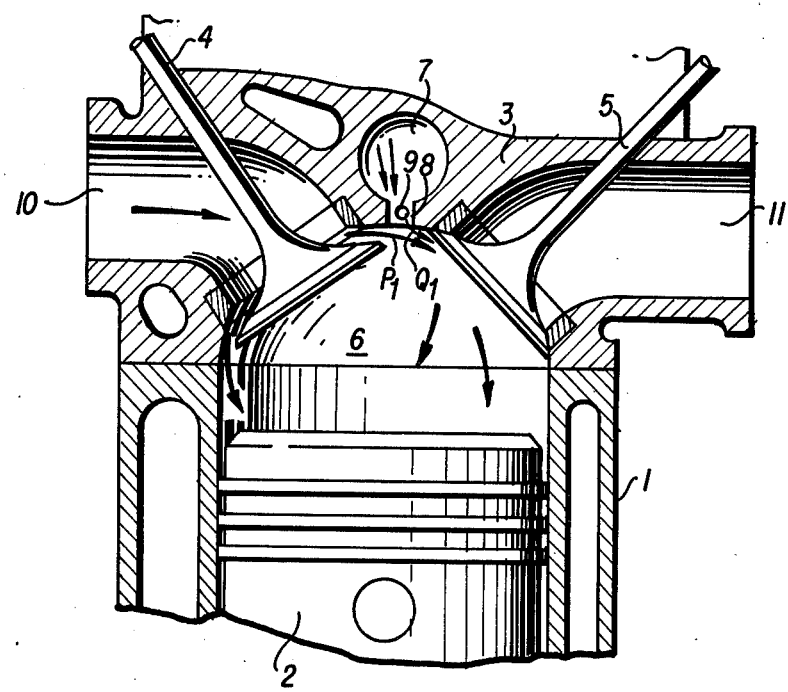
FIG. 3 is a sectional view employed to explain the action of the intake combustible mixture flows which purge the exhaust gas from the auxiliary combustion chamber.

The torch ignition type internal combustion engine of the invention with the construction as described above operates as follows. Referring to FIG. 3, when the intake valve 4 is opened upon commencement of the intake stroke of the piston 2 (moving downward in FIG. 3), the combustible mixture is drawn into the main combustion chamber 6 by the vacuum established within the cylinder 1. In this instance, the flow of the combustible mixture is deflected in the direction indicated by arrow $P_1$ due to interference from the intake valve 4 which normally has a relatively small lift. Since the passage 8 is opened into the main combustion chamber 6 at a position close to the intake valve 4 as mentioned hereinbefore, the exhaust gas remaining in the auxiliary combustion chamber 7 is purged therefrom by the suction action of the vacuum generated by the intake combustible mixture flow $P_1$ as indicated by arrow $Q_1$. The sucking and purging of the exhaust in the auxiliary combustion chamber occur due to the ejection effect induced by the intake combustibel mixture flow $P_1$. When the intake valve 4 is closed with the piston 2 reaching the bottom dead center position, the combustible mixture within the cylinder is allowed to enter and fill the auxiliary combustion chamber 7. Upon commencement of the compression stroke by the piston 2, the combustible mixture within the main combustion chamber 6 is further urged into the auxiliary combustion chamber 7 until the pressure in the main combustion chamber and the pressure in the auxiliary combustion chamber become uniform. The ignition plug 9 has its sparking electrode located within the passage 8 and is always exposed to the fresh combustible mixture in the passage 8 so that it can easily ignite the combustible mixture within the auxiliary chamber 7 without being influenced by the residual exhaust gas, if any, within the auxiliary chamber 7.

Figure 4:
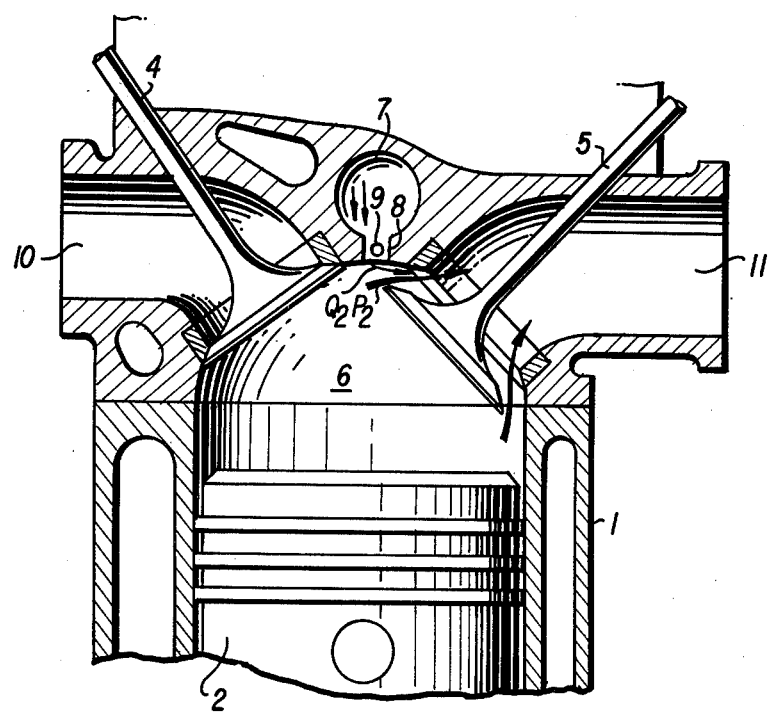
FIG. 4 is a sectional view employed to explain the action of the exhaust gas flows which purge the auxiliary combution chamber.

FIG. 4 shows the purging of the auxiliary combustion chamber 7 by the exhaust gas flows, which is similar to the sucking and purging action of the intake combustible mixture flows discussed hereinbefore with reference to FIG. 3. More particularly, the exhaust gas flows through the exhaust valve 5 into the exhaust gas passage 11 of the exhaust manifold as shown by arrow $P_2$. The exhaust gas remaining in the auxiliary combustion chamber 7 is sucked and purged therefrom as shown by arrow $Q_2$ by the vacuum generated by the exhaust gas flows $P_2$.

Figure 5:
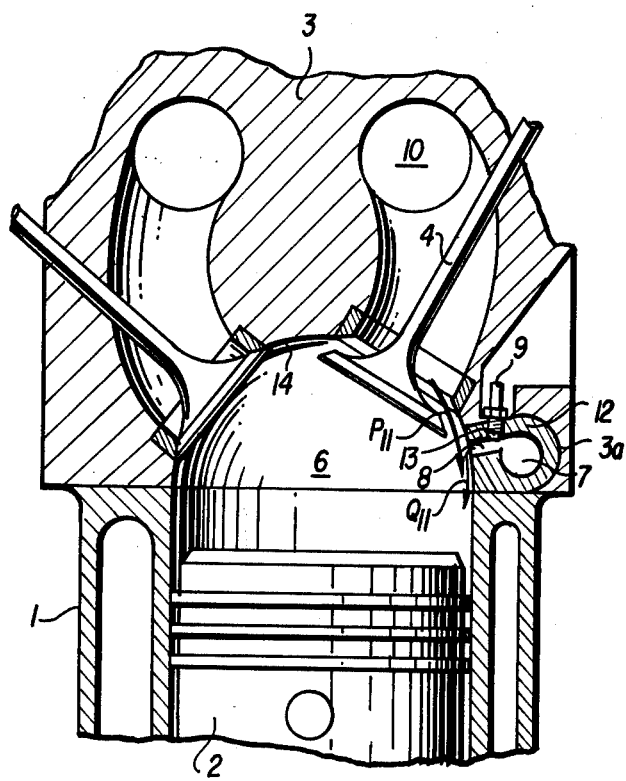
FIG. 5 is a sectional view of another embodiment of this invention.

Referring next to FIG. 5 another embodiment of this invention will be described, in which an opening of the passage intercommunicating the main and auxiliary combustion chambers is eccentrically located in the semi-spherically shaped main combustion chamber, namely, at a position closer to the upper end of the cylinder.

In this torch ignition type internal combustion engine, the main combustion chamber 6 is substantially semi-spherical in shape. The cylinder head 3 has a recess 3a therein and includes an auxiliary combustion chamber shell 12 which is received in the recess 3a. The auxiliary combustion chamber shell 12 has the auxiliary combustion chamber 7 formed therein. The passage 8 intercommunicating the main and auxiliary combustion chambers 6 and 7 is opened in the vicinity of the intake valve 4 in the main combustion chamber 6, and at a position closer to the upper end of the cylinder 1 than that of the intake valve 4. The ignition plug 9 is disposed in such a manner that its electrode portion 13 is exposed to the passage 8.

In the torch ignition type internal combustion engine of the above-described FIG. 5 construction, the intake gas flow $P_{11}$, which has been introduced through the intake valve 4 into the main combustion chamber 6, flows along the semi-spherically concave inner wall 14 of the main combustion chamber 6 as shown in FIG. 5. The intake gas flow is produced when the air-fuel mixture in the intake pipe 10 is introduced into the main combustion chamber 6 by the vacuum established therein during the descending stroke of the piston. Accordingly, that part of this intake gas flow flows most swiftly and smoothly which is directed in the longitudinal direction of the cylinder 1 in which the piston 2 descends. The intake gas flow $P_{11}$ in this embodiment, directed to flow in the descending direction of the piston and along the semi-spherically concave inner wall 14 of the main combustion chamber 6, flows most smoothly. When passing the opening of the passage 8, this intake gas flow $P_{11}$ accomplishes purging, drawing out the exhaust gases remaining in the auxiliary combustion chamber 7 as indicated by arrow $Q_{11}$.

As mentioned above, this embodiment is so designed as to permit that portion of the intake gas flow which is used for purging the auxiliary combustion chamber to flow most swiftly and smoothly, thus insuring a remarkable purging effect. In addition, the ignition plug 9 is fitted in such a manner that its electrode portion 13 faces the passage 8. Therefore, the electrode portion 13 is always exposed to the fresh air-fuel mixture introduced from the main combustion chamber 6 into the auxiliary chamber 8 during the compression stroke of the piston 2, thereby preventing lowering of ignitability that might otherwise occur.

It will be clear from the foregoing description that, according to the present invention, the exhaust gas is effectively purged from the auxiliary combustion chamber, thereby eliminating the ignition failure which has been an unavoidable drawback of the existing torch ignition type internal combustion engine with no intake valve in the auxiliary combustion chamber.

What we claim is:

1. A torch ignition type internal combustion engine of the type which has no intake valve in the auxiliary combustion chamber, comprising:
    a cylinder,
    a cylinder head having a semi-spherical concave shaped inner wall,
    means defining an intake port in said cylinder head,
    means defining an exhaust port in said cylinder head,
    a reciprocable piston snugly received in said cylinder,
    a main combustion chamber defined between said cylinder head and said piston,
    an intake valve and an exhaust valve to control said intake port and said exhaust port in the cylinder head respectively,
    means defining an auxiliary combustion chamber in the cylinder head, said auxiliary combustion chamber having no intake valve,
    means defining a passage in said cylinder head intercommunicating said main combustion chamber and said auxiliary combustion chamber and opening into said main combustion chamber at a position close to one of said intake valve and said exhaust valve; and
    an ignition plug having an electrode portion, said plug being so disposed as to expose its electrode portion in said passage from a side thereof.

2. A torch ignition type internal combustion engine as defined in claim 1, wherein said intercommunicating passage opens into said main combustion chamber at the side of the semi-spherical concave inner wall thereof near said intake valve.

3. A torch ignition type internal combustion engine as defined in claim 1, wherein said passage opens into said main combustion chamber at the side of the cylinder head near a valve.

4. A torch ignition type internal combustion engine as defined in claim 3, wherein said passage opens into said main combustion chamber at a position close to the intake valve and intermediate the intake valve and the cylinder.

5. A torch ignition type internal combustion engine as defined in claim 4, further comprising means defining a recess in said cylinder head, said cylinder head comprising an auxiliary combustion chamber shell in said recess, and said auxiliary combustion chamber being defined in said shell.

6. A torch ignition type internal combustion engine as defined in claim 5, wherein said passage is defined in said shell.

7. A torch ignition type internal combustion engine as defined in claim 1, wherein said passage opens into said main combustion chamber at a position close to and substantially intermediate said intake valve and said exhaust valve.

8. A torch ignition type internal combustion engine as claimed in claim 1, wherein:
    said passage opens into said auxiliary combustion chamber in a direction tangential to the means defining the auxiliary combustion chamber.

* * * * *